July 29, 1947.　　S. LE B. GAMBLE　　2,424,654
FLUID MIXING DEVICE
Filed June 3, 1944
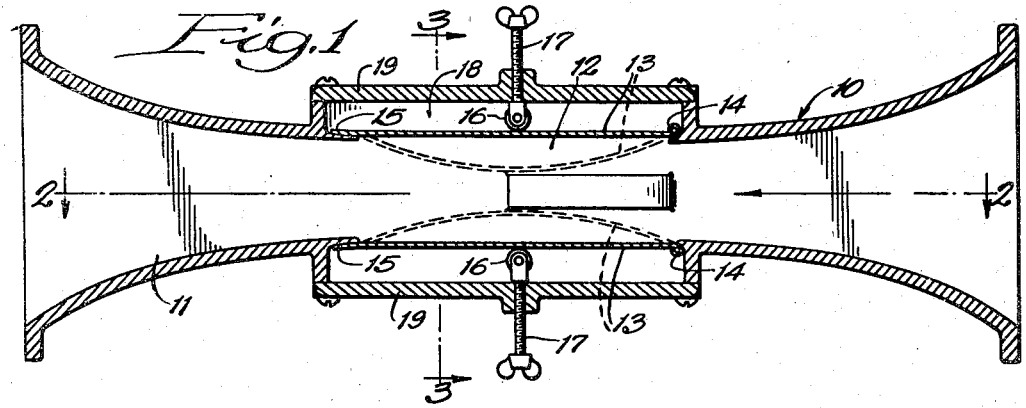
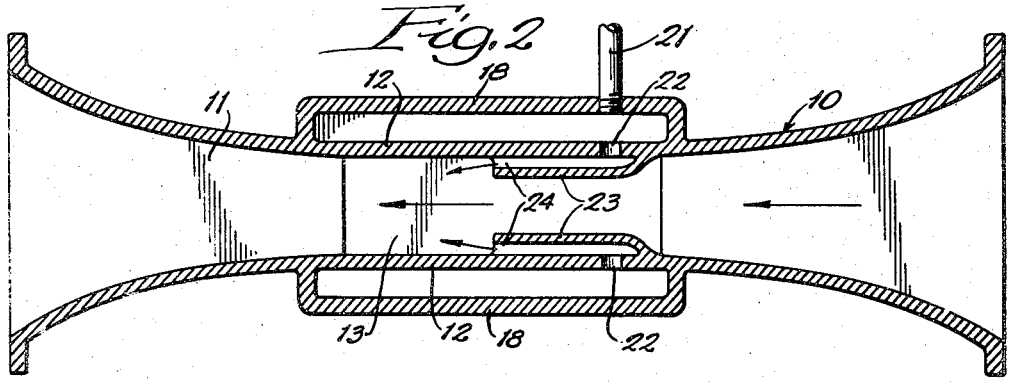
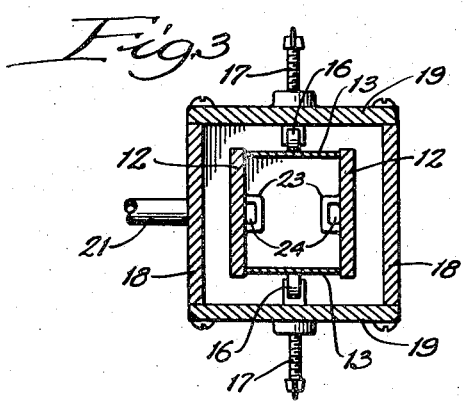
Inventor:
Slade leBlount Gamble,
By Dawson, Ooms & Birth,
Attorneys.

Patented July 29, 1947

2,424,654

UNITED STATES PATENT OFFICE 2,424,654

FLUID MIXING DEVICE

Slade le Blount Gamble, Chicago, Ill., assignor to Lindberg Engineering Company, Chicago, Ill., a corporation of Illinois Application June 3, 1944, Serial No. 538,623

4 Claims. (Cl. 48—180)

This invention relates to mixing devices and method and more particularly to control of proportional entrainment of one fluid by another.

In prior types of mixing devices for mixing two fluids, such, for example, as combustible gas and air, wherein the kinetic energy of the primary fluid is utilized to aspirate the secondary fluid, it is usually necessary that the back pressure on the downstream side of the device be limited to an amount less than approximately 60% of the pressure of the primary fluid on the upstream side of the device in order that the secondary fluid will be appropriately entrained. Also, such prior types of mixing devices require the establishment of relatively precise complementary relationship between such factors as entering pressure of the primary and secondary fluids, maximum and minimum rate of flow of either or both fluids, downstream pressure of the mixed fluids and velocity ratio (entering versus throat velocity) of the aspirating fluid as determined by the boundaries of the flow passage of the primary fluid. This compels that for such prior types of mixing devices to serve the requirements of varied service or installation conditions the device be available in a vast multiplicity of incremental sizes in order to afford the minute incremental changes in velocity ratio of the aspirating fluid required of the service conditions mentioned above. Since some of the governing service conditions are not always predictable, the manufacturer of such prior devices has found it necessary to resort to the wasteful expediency of sacrificing efficiency in the serviceable utilization of the kinetic and potential energy of the primary fluid in order to assure the appropriate aspiration of the secondary fluid.

Such prior devices have generally been controlled to vary the ratio of the secondary fluid to the primary fluid by throttling the secondary fluid supply. While the ratio can effectively be controlled in this manner, such control cannot provide adjustments for maximum utilization of the energy available in the primary fluid.

Accordingly, it is one object of the present invention to provide a ratio control method and apparatus which will render available a maximum portion of the potential and kinetic energy of the primary fluid as useful energy in the mixed fluids.

Another object of the present invention is to provide a mixing device which can adjustably accommodate itself to variable service conditions without sacrifice of efficiency and with a minimum number of incremental sizes to encompass different rates of maximum flow.

An important object of the present invention is to present a flow passage for the primary fluid which may be adjusted so that a substantially correct and efficient kinetic flow shape is adjustably provided for a considerable range of variation in the circumstances of the installation conditions.

Still another object of the present invention is to provide a method and apparatus wherein a proportional entrainment of a secondary fluid is controlled by varying the velocity ratio of a primary fluid and of rendering said velocity ratio adjustably commensurate to the installation circumstances with respect to the related components of pressures and volumes.

Another object of the present invention is to provide a mixing device in which the ratio of primary and secondary fluids can be regulated by adjustment of the throat area of the mixing device.

A still further object is to provide control of the downstream potential and kinetic energy with respect to the energy of the primary fluid by adjustably varying the boundaries of the primary fluid flow passage so that more of the energy of primary fluid will be available in the mixture of the two fluids for serviceable utilization of the mixed fluids.

The above and other objects and advantages will be more readily apparent from the following description when read in connection with the accompanying drawing, in which—

Figure 1 is a central vertical section through a mixing device embodying the invention;

Figure 2 is a section on the line 2—2 of Figure 1; and

Figure 3 is a transverse section on the line 3—3 of Figure 1.

The mixing device illustrated in the drawings comprises an elongated tube or conduit 10 having outwardly flaring end portions 11 adapted to be connected in a fluid flow line. The central portion of the conduit is rectangular in shape as seen in Figure 3, and comprises spaced side plates 12 which are open at their opposite edges to form enlarged openings into the conduit. If desired, the entire conduit may be rectangular or the flared end portions 11 may be made circular for connection to standard pipes.

The open sides of the rectangular central portion of the conduit are closed by flexible strips 13 of spring metal or the like pivoted at 14 adjacent one end of the openings into the conduit and overlapping the conduit at their opposite free ends as indicated at 15. The strips 13 are of such a width as to fit slidably between the plates 12 substantially to prevent flow of any fluid around their edges and may be pressed together in their central portions to vary the flow area by any desired type of mechanism. As shown, the strips are controlled by rollers 16 carried by screws 17 for pressing the central portions of the strips together under manual control although it will be understood that any other desired manual or automatic control could be employed. When the strips are pressed in as indicated in dotted lines as shown in Figure 1, they form a smoothly curved passage through the central rectangular portion of the conduit.

The secondary fluid may be supplied to the conduit through a casing enclosing the central rectangular portion thereof and forming sides 18 cast integrally with or otherwise connected to the conduit. Cover plates 19 are secured over the open ends of the plates 18 and carry the screws 17. Fluid is supplied to the casing through a pipe 21 and is conducted from the casing into the conduit 10 through ports 22 formed in the fixed sides of the rectangular portion of the conduit.

In order to direct the secondary fluid properly into the conduit and to provide limiting stops for the flexible strips 13, channel members 23 are formed on the interior of the conduit communicating with the ports 22 and open at their downstream ends as indicated at 24.

In operation, the device may be installed in a pipe or conduit through which a primary fluid flows in the direction of the arrows. Flow of the primary fluid causes a partial vacuum in the reduced central portion of the devices which induces a flow of the secondary fluid from the casing through the ports 22 and channels 23.

When the mixing device is installed, it is necessary only to fit it to the pipe size for the primary fluid and the flexible strips 13 may then be adjusted to provide the correct throat area for the existing pressure and flow conditions. Thus one size of mixing device may serve applications requiring several fixed sizes and can be adjusted to better approximate ideal conditions than where fixed devices are used. In the same manner, the throat shape or area in the primary flow passage may be varied to regulate the proportional entrainment of the secondary fluid thereby to control the fluid ratios. This insures maximum pressure conditions downstream of the mixing device and maximum operating efficiency.

While the invention has been illustrated as embodied in an apparatus having a rectilinear flow passage, it will be understood that, in its broad concept, various other shapes, materials and methods of adjustment could be employed. It is, therefore, not intended that the embodiment illustrated shall serve as a definition of the scope of the invention, reference being had for this purpose to the appended claims.

What is claimed is:

1. A mixing device comprising an elongated conduit formed with a portion of rectangular section having an opening in one side, a flexible strip connected to the conduit adjacent one end of the opening and overlying the opening with its other end free, means to press the central portion of the strip into the opening to vary the flow area of the conduit, and channel shaped members projecting inwardly from the sides of the conduit and open at the end facing downstream to provide for inlet of a second fluid into the conduit.

2. A mixing device comprising an elongated tube to conduct a flowing fluid having a central rectangular portion with two opposite sides open, flexible strips overlying the open sides and of a width to fit slidably between the other sides, means to press the central portions of the strips together so that they will curve inwardly to vary the flow area, and channel shaped members projecting inwardly from the fixed sides of the central rectangular portion and open at the end facing downstream to form inlet openings in the channel.

3. A mixing device comprising an elongated conduit having flaring ends and a rectangular central portion with openings in its opposite sides, flexible strips overlying the openings, means to press the strips into the openings, and a casing enclosing the central conduit portion and communicating with a second fluid, the central portion of the conduit having inlet openings in its sides between the flexible strips communicating with the casing.

4. A mixing device comprising an elongated conduit having flaring ends and a rectangular central portion with openings in its opposite sides, flexible strips overlying the openings, means to press the strips into the openings, a casing enclosing the central conduit portion and communicating with a second fluid, and channel members on the interior of the conduit communicating with the casing and having their ends facing downstream open to conduct fluid from the casing into the conduit.

SLADE LE BLOUNT GAMBLE.

REFERENCES CITED

The following references are of record in the file of this patent:

UNITED STATES PATENTS

| Number | Name | Date |
|---|---|---|
| 2,066,544 | Shaw | Jan. 5, 1937 |
| 1,459,961 | Wheeler | June 26, 1923 |
| 1,360,445 | Rollins | Nov. 30, 1920 |
| 2,366,322 | Foster | Jan. 2, 1945 |
| 2,321,483 | Haedike | June 8, 1943 |